United States Patent [19]

Baer

[11] Patent Number: 5,059,764
[45] Date of Patent: Oct. 22, 1991

[54] DIODE-PUMPED, SOLID STATE LASER-BASED WORKSTATION FOR PRECISION MATERIALS PROCESSING AND MACHINING

[75] Inventor: Tom Baer, Mountain View, Calif.
[73] Assignee: Spectra-Physics, Inc., San Jose, Calif.
[21] Appl. No.: 265,052
[22] Filed: Oct. 31, 1988
[51] Int. Cl.$^5$ .............................................. B23K 26/00
[52] U.S. Cl. .......................... 219/121.68; 219/121.61; 219/121.69; 219/121.78; 219/121.82
[58] Field of Search ...................... 219/121.68, 121.69, 219/121.82, 121.61, 121.62, 121.83, 121.78; 372/71, 108

[56] References Cited

U.S. PATENT DOCUMENTS

| | | |
|---|---|---|
| 3,400,456 | 9/1968 | Hanfmann . |
| 3,657,510 | 4/1972 | Rothrock . |
| 3,753,145 | 8/1973 | Chesler . |
| 3,902,036 | 8/1975 | Zaleckas . |
| 3,982,201 | 9/1976 | Rosenkrantz et al. . |
| 4,568,409 | 2/1986 | Caplan . |
| 4,576,480 | 3/1986 | Travis . |
| 4,638,145 | 1/1987 | Sakuma et al. . |
| 4,653,056 | 3/1987 | Baer et al. . |
| 4,656,635 | 4/1987 | Baer et al. . |
| 4,665,529 | 5/1987 | Baer et al. ........................ 772/108 |
| 4,701,929 | 10/1987 | Baer et al. . |
| 4,710,605 | 12/1987 | Presby . |
| 4,734,550 | 3/1988 | Imamura et al. ............ 219/121.82 X |
| 4,734,912 | 3/1988 | Scerbak et al. . |
| 4,739,507 | 4/1988 | Byer et al. . |
| 4,756,765 | 7/1988 | Woodroffe . |
| 4,761,786 | 8/1988 | Baer . |
| 4,772,121 | 9/1983 | Trageser . |
| 4,794,222 | 12/1988 | Funayama et al. . |
| 4,794,615 | 12/1988 | Berger et al. . |
| 4,806,728 | 2/1989 | Salzer et al. . |
| 4,825,034 | 4/1989 | Auvert et al. ............... 219/121.83 X |

Primary Examiner—C. L. Albritton
Attorney, Agent, or Firm—Lyon & Lyon

[57] ABSTRACT

A diode laser pumped, solid state laser-based system and related method of operation for precision materials processing and machining is described. A component of the system is a diode laser pumped, q-switched, fiber-coupled, solid state laser which produces a pulsed beam having a pulse width of approximately 50 ns or less, which width is necessary for material removal by ablation. Other components of the system include an optical subsystem such as a microscope, a stepper-motor controlled workstation, an imaging subsystem such as a video camera coupled to a monitor, and control means such as a personal computer. The system can be operated in either a manual or an automatic mode.

22 Claims, 2 Drawing Sheets

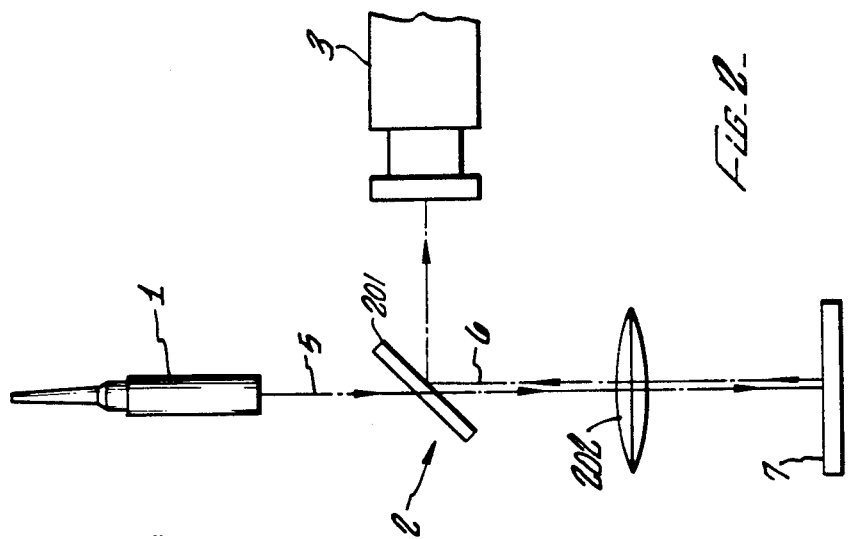
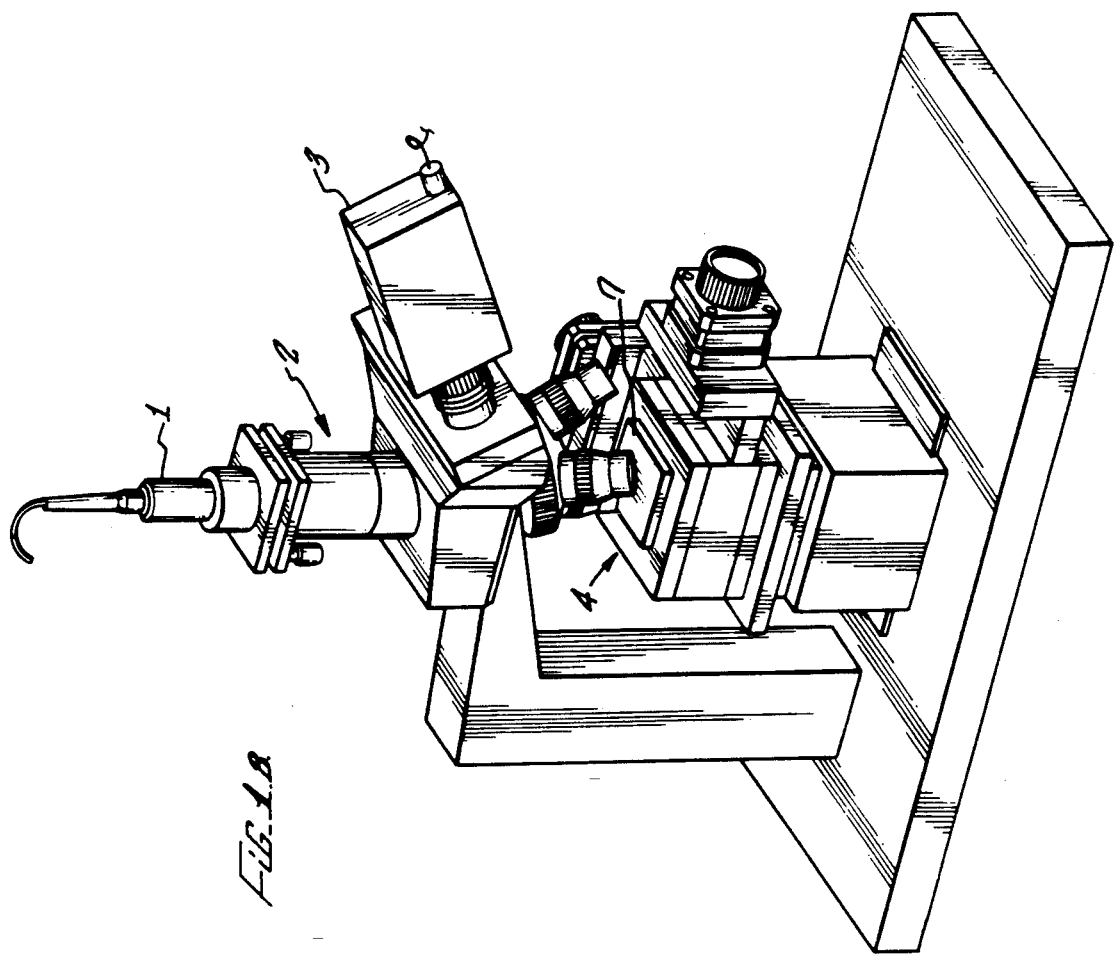

DIODE-PUMPED, SOLID STATE LASER-BASED WORKSTATION FOR PRECISION MATERIALS PROCESSING AND MACHINING

BACKGROUND OF THE INVENTION

1. Field of the Invention

This invention relates generally to a diode-pumped, solid state laser-based workstation for use in a variety of precision materials processing and machining applications, and more specifically, to a workstation employing a diode laser endpumped, q-switched, fiber-coupled, solid state laser which produces a pulsed laser beam for ablating, and hence making precision cuts in, the surface of the material.

2. Background of the Invention

Lasers have been used in a variety of materials processing and machining applications. Their primary advantage is that they provide a directed energy beam at high average power which can be focused to micron beam diameters, allowing unique materials processing applications to be developed, such as the using lasers for semiconductor memory repair via link blowing, or precision engraving applications.

A requirement of lasers used in these types of applications in that the laser deliver short, high energy pulses having a pulse width which is short compared to the thermal diffusion time of the material being processed. This is necessary so that the material will ablate from the surface, that is evaporate without melting, enabling the laser to make precise and accurate cuts on the surface of the material. In fact, laser pulse widths of 50 ns or lower are typically necessary to achieve material removal by ablation.

Solid state lasers are particularly advantageous in producing a pulsed beam output since they have a long excited state lifetime, and hence can store energy from the laser pump source and then release the energy over a short time period through a process called q-switching. To produce pulses having a short enough width for ablation, as is known, lasers having either a short cavity or high gain are required, since pulse width depends on the product of gain and cavity round trip time. However, solid state lasers used in the art are typically pumped with an arc lamp, which is a broadband source, and not particularly efficient in pumping a solid state laser since it will pump portions of the lasing medium which will not contribute to production of the output beam, and because it contains many different wavelengths which will not be absorbed by the laser medium. In fact, the arc lamp electrical efficiency is typically only about 0.5%. The net result is that the gain per unit length of the system will be low, necessitating that the laser material be relatively long so that enough lasing material will be present for the laser to achieve the necessary gain required and thus produce a short pulse width. For example, a cavity having a 1 foot length is typically required.

In addition, because the gain is so low, quite a bit of input power must be applied to produce a short pulse, necessitating in many instances that water cooling of the laser head take place to control heat dissipation, and also necessitating that the laser be coupled to a 230 VAC outlet to produce the several kilowatts of input power which must typically be supplied to achieve the requisite gain. Moreover, the large cavity length implies a large beam diameter which will require a large q-switch to produce the pulsed output necessary for ablation.

The turbulence of the water cooling is problematic for precision materials processing and machining. This is because noise will be introduced into the pulsed laser beam by coolant water turbulence, which will limit the precision of the cuts possible.

In addition, the high input power required will be problematic for the additional reason that the energy delivered by the laser at the short pulse width will be much too high for ablation and precision cuts, necessitating that the laser output be attenuated before impinging upon the material. Lower power arc-lamp pumped solid state lasers are not a possible solution to the attenuation problem since they will not produce the short pulse widths required for material ablation. The net result is that the pulse width/energy level combination required for successful material ablation is not achievable with conventional, arc-lamp pumped, q-switched, solid state lasers.

The combined impact of the long cavity length and large q-switch, the required 230 VAC hook-up, the water cooling of the laser, and the attenuation of the laser output, make the laser bulky and mechanically difficult to integrate into an optical system for downstream focusing, shaping, and directing of the beam which may be required, and also make the laser and system in which it is integrated unwieldy and lacking in portability.

The low electrical efficiency provides for a significant amount of heat dissipation in the laser head of the laser, necessitating that a cooling system be applied to the laser head. A problem for precision materials processing is that vibrations from the cooling system will be coupled to the laser head, causing the head to move, and resulting in less precise cuts.

Finally, the arc lamp in such a laser is coupled to the laser head, often necessitating that the laser head be aligned and readjusted every time the arc lamp is required or serviced.

Accordingly, it is an object of the present invention to provide a solid state laser for use in a workstation for high precision materials processing, which provides the proper pulse width/energy level combination for ablation, which provides for efficient pumping in a compact laser cavity, which eliminates the need for water cooling with the attendant water turbulence induced noise to the laser output beam, which is small, compact, and easily integrable into an optical system for downstream focusing and directing of the beam, and which decouples the vibrations of the cooling system of the pumping source from the laser head, enabling the laser to produce more precise cuts.

SUMMARY OF THE INVENTION

To achieve the foregoing objects, and in accordance with the purpose of the invention as embodied and broadly described herein, there is provided a diode-laser end-pumped, solid state laser-based workstation for precision materials processing and machining. A key component of the workstation is a diode-laser end-pumped, q-switched, fiber-coupled, solid state laser for producing a pulsed laser beam having a beam width, pulse width, and energy level necessary for ablation.

End pumping is beneficial since it results in high efficiency pumping. This is because end pumping allows only those areas of the lasing medium which will contribute to the production of the output beam to be excited. For precision materials processing, the TEM$_{00}$ mode is particularly advantageous, since it has a smooth intensity profile, with no nodes or zeroes, and it is diffraction limited. End pumping is particularly efficient for producing the TEM$_{00}$ mode.

Diode laser pumping also contributes to high efficiency pumping, since the diode laser is monochromatic, and can be tuned to maximize its absorption by the laser material. In fact, compared with arc lamp pumping, which achieves an electrical efficiency on the order of 0.5%, diode laser pumping achieves a electrical efficiency on the order of 10%. Because of the higher electrical efficiency, the laser can be set up for 115 VAC operation, improving its portability, and eliminating the need for 230 VAC operation and the attendant water cooling and turbulence noise of the output beam. In addition, the elimination of water cooling contributes to the compact size of the laser.

The combined impact of end pumping and diode laser pumping is high gain at lower input power levels, enabling the laser to produce short pulses even in a short cavity at the correct pulse-width/energy level combination required for precision material ablation. Additional benefits are that the laser can be made very compact, the need to attenuate is eliminated, forced air cooling can be substituted for water cooling, and little or no heat dissipation takes place in the laser head.

The particular q-switch chosen to be used with the laser contributes to the compact size, gain, and efficiency of the laser. These benefits are achieved by using a q-switch comprised of a material having a higher acoustic-optic figure of merit than traditional fused silica, which makes the q-switch more efficient, so that it too can be made more compact along with the laser cavity.

Fiber coupling enables the laser head to be extremely compact, and easily integrable with an imaging system such as a microscope for directing and focusing of the laser beam. This is because the use of fiber coupling enables the laser head to be spaced from the diode laser so that only the laser head need be mounted in the imaging system while the rest of the laser is kept in a central staging area. An additional advantage is that fiber coupling enables the diode laser to be mounted in the power supply, and cooled via the forced air cooling system used to cool the power supply. The forced air cooling system typically includes a fan, and spacing the diode laser from the laser head eliminates the coupling of fan vibration to the laser head, which in turn, contributes to the precision of the system.

The spacing of the diode laser from the laser head further enables the diode laser to be replaced or serviced without requiring the laser head to be dismounted and realigned.

The net result is that the laser will produce a pulsed beam having a beam width of approximately 200-300 microns or less, a pulse width of approximately 50 ns or less, and an energy level of approximately 100 $\mu$J or less. Moreover, the laser beam can easily be focused down to a width of approximately 10-30 microns, and even 1-2 microns for those applications requiring the most precision. An advantageous laser beam for precision materials processing has a beam width of as little as 1-2 microns, a pulse width of approximately 30 ns, and an energy level of approximately 10 $\mu$J. These characteristics are advantageous for precision materials processing applications such as semiconductor memory link blowing and repair, since a link has a dimension on the order of 1-2 microns, and a 30 ns pulse at 10 $\mu$J will ablate the link. The same holds true for precision engraving applications.

Other components of the system include an optical subsystem such as a microscope mechanically coupled to the laser, an aiming beam collinear to the pulsed laser beam, an imaging subsystem including a video camera electrically coupled to a monitor, a stepper-motor controlled workstation for holding and positioning the material being processed with respect to the pulsed laser beam, and control means such as a personal computer electrically coupled to the laser and to the workstation. In addition, the video camera of the imaging subsystem is mechanically coupled to the optical subsystem.

The optical subsystem directs the pulsed beam along a straight path to the surface of the material held by the workstation. A focusing lens is placed along the optical path. The pulsed beam intersects the lens and is focused to a beam having a width of as little as 1-2 microns or less. The focused beam strikes the surface of the material, and ablates it.

To position the pulsed beam, the aiming beam is used. The aiming beam is collinear with the pulsed laser beam, and can either be the leakage light from the diode laser, the laser light from the solid state laser while operating in continuous wave (cw) mode at low power, or an aiming beam from an independent light source.

The aiming beam is also directed by the optical subsystem along the same straight path as the pulsed beam to strike but not ablate the surface of the material. The beam then reflects from the surface, and partially retraverses the optical path. Also placed in the optical path and spaced from the focusing lens is a beam splitter. The reflected beam intersects the beam splitter, and a portion of the reflected beam is directed to the video camera of the imaging subsystem, which directs the monitor to visually display an image of the surface of the material using the reflected portion of the beam.

The workstation positions the material under process at a particular location with respect to the laser before the transmission of the pulsed beam in order to make a precise cut in the surface of the material at the particular location. At present, two modes of operation are provided: manual and automatic.

In both modes of operation, a user controls the laser and the workstation through a series of commands issued via the control means, which can be a personal computer (hereinafter "PC"). In the manual mode, a user positions the beam to the desired location by visually tracking the position of the beam via the monitor, and issuing commands to change the position. The user then directs the laser to transmit one or more pulses to oblate the material.

In the automatic mode of operation, the user first positions the laser beam to a reference location on the surface of the material, either manually, by visually positioning the beam using the monitor as described above, or automatically, by invoking pattern recognition software resident in the PC. In this latter instance, images of the surface of the material are converted to data descriptive of the surface, and sent to the pattern recognition software in the PC, which analyzes the data to detect whether a predetermined pattern such as a bar code previously marked on the surface of the material is present. The surface of the material is automatically scanned until the pattern is detected and the beam is positioned at the reference location indicated by the pattern.

Next, the user creates data descriptive of the location (with respect to the reference location) and depth of one of more cuts to be made in the surface of the material, and loads the data into the PC. The PC then directs the laser to selectively transmit the pulsed beam, and also directs the workstation to position the material with respect to the pulsed beam so that the beam oblates and makes cuts in the surface of the material at the locations and depth described by the data.

BRIEF DESCRIPTION OF THE DRAWINGS

FIG. 1(B) shows a block diagram of a tilted side view of the exemplary embodiment of FIG. 1(A); and FIG. 2 is a block diagram of the optical subsystem of the subject invention.

DESCRIPTION OF THE PREFERRED EMBODIMENT

Figure 1A:
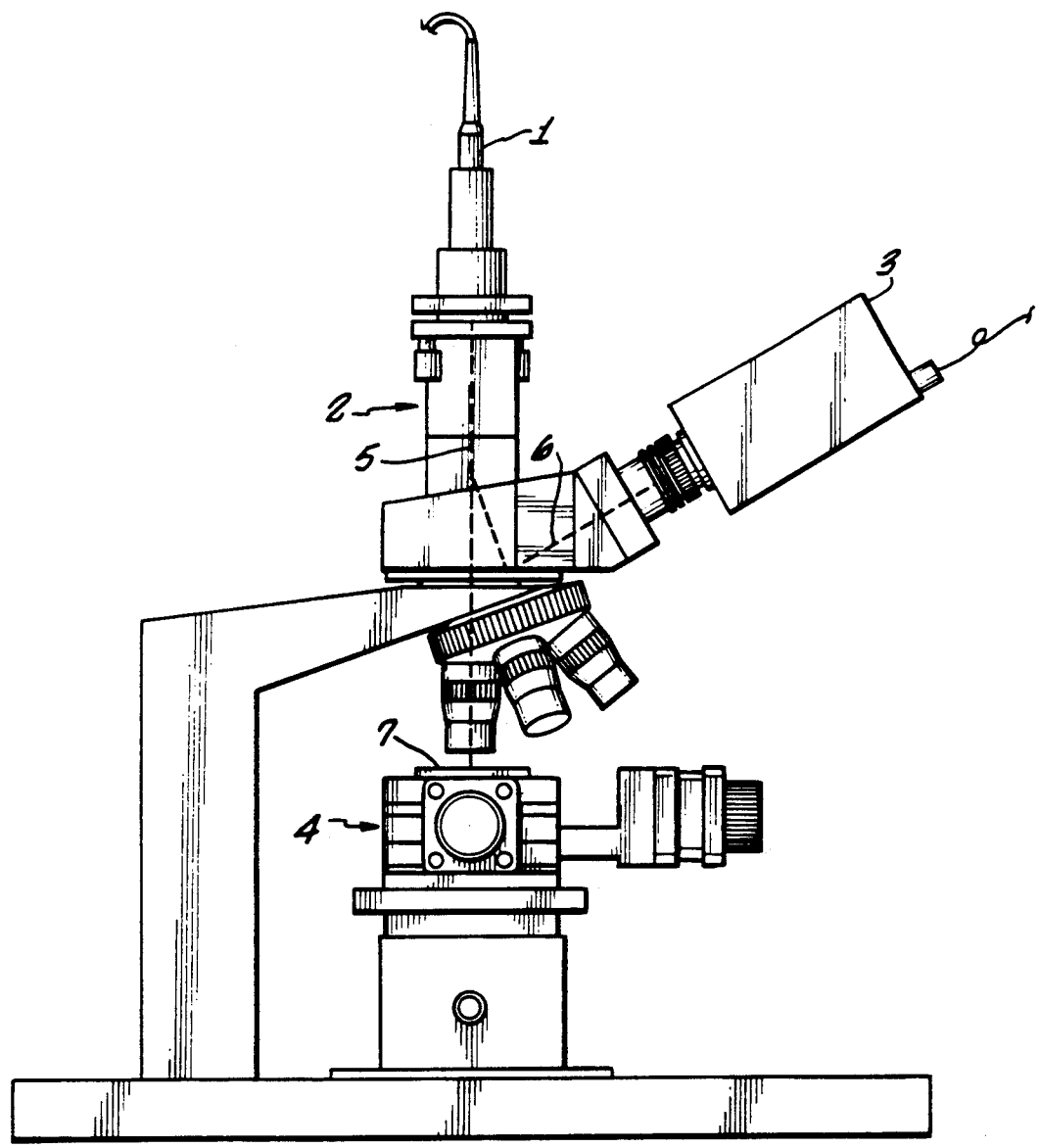
FIG. 1(A) shows a block diagram of a side view of an exemplary embodiment of the subject invention.

An exemplary embodiment of the subject invention is shown in FIG. 1. As illustrated in the Figure, the embodiment comprises diode-laser end-pumped, solid state laser 1, optical subsystem 2, imaging subsystem 3, workstation means 4, optical paths 5 and 6, material under process 7, and control means (not shown). The imaging subsystem advantageously comprises an aiming beam collinear with the pulsed laser beam, and a video camera electrically coupled to a monitor (not shown). The optical subsystem is advantageously a microscope, and the control means is advantageously a personal computer ("PC"). In addition, the workstation means is advantageously an X-Y stepper motor-controlled workstation for stepping horizontally, vertically, or both in response to commands from the PC.

As illustrated in the Figure, the laser is mechanically coupled to the optical subsystem, which in turn is mechanically coupled to the video camera of the imaging subsystem. In addition, the video camera is electrically coupled to the monitor, and is optionally electrically coupled to the control means. The control means is electrically coupled to the laser and to the workstation means for selectively directing the laser to transmit a pulsed laser beam, and directing the workstation means to position the material with respect to the laser beam. The microscope or other optical subsystem directs the pulsed laser beam along an optical path to the surface of the material being processed, whereupon the beam oblates the surface. The microscope or other optical subsystem also directs the collinear aiming beam along the same optical path to strike but not oblate the surface of the material. After the aiming beam strikes the surface, it will then reflect from it. The reflected beam then partly retraverses the optical path, and the optical system directs a fraction of the reflected beam to the video camera of the imaging system, which directs the monitor to visually display an image of the surface of the material at the location where the beam strikes. The visual display of the surface will be important for manually positioning the pulsed laser beam on the surface of the material.

Diode-laser pumped, solid state laser 1 is a diodelaser end-pumped, q-switched, fiber-coupled, solid-state laser as described more fully in Baer et al., U.S. Pat. No. 4,665,529, which is herein incorporated by reference as though fully set forth herein.

As explained in Baer et al., the laser comprises a laser head which is pumped by a diode laser, wherein the laser head is spaced from and optically coupled to the diode laser by means of a fiber optic cable.

The decoupling of the diode laser from the laser head enables the laser head to be more compact, and inserted easily into a standard microscope or other optical subsystem. Contributing to the compact size of the laser head is the high pumping efficiency achievable with diode laser end-pumping, which enables the laser head to be extremely compact, and still have a high enough gain to produce short enough pulses for material oblation. (The high pumping efficiency will be discussed in detail below.) Also contributing to the compact size is the use of a q-switch having a high diffraction efficiency, which q-switch is made from a nontraditional material having a higher acoustic-optical figure of merit than traditional fused silica, resulting in a more compact, miniaturized q-switch.

The compact size of the laser simplifies the mechanical design of the system. By way of comparison, conventional arc lamp pumped, q-switched, solid state lasers are typically 1 meter in length with a cross section of 20 cm. by 20 cm. In contrast, a fiber-coupled, diode laser end-pumped, q-switched solid state laser head can be as small as 8 cm. in length with a diameter of 2 cm. An exemplary laser head is the Spectra-Physics Model 7950 Q-switched laser head. An exemplary laser system of which the laser head is a key component comprises the Spectra-Physics Model 7200 diode laser module, the Model 7250 Q-switch driver, the Model 7950 Q-switched laser head, and an optional frequency doubling accessory Model 7955 allowing pulsed operation in the visible.

Another benefit of fiber optic coupling in combination with the high pumping efficiency is that little or no heat dissipation will be required in the laser head. Most of the heat dissipation will be localized in the power supply or the diode laser, and any cooling required can be localized there. Since the diode laser is decoupled and spaced from the laser head, the attendant vibrations associated with a cooling system can be insulated from the laser head, enabling the laser head to produce a more precise cut in the material being processed or machined.

Another benefit of fiber coupling is that servicing or replacing of the diode laser will not require dismounting or realigning of the laser head, and servicing of the laser, and hence the subject invention, will be easier.

The advantage of end pumping is that it is very efficient, enabling only those regions of the active media that will contribute to the production of a selected lasing mode to be pumped. In other words, end pumping provides for the best overlap of the pump volume with the lasing volume of the particular mode which is desired. These principles are discussed in more detail in Baer et al., but will be summarized here.

For materials processing, the $TEM_{00}$ mode is an ideal mode since it is a diffraction limited beam compared to the other modes, and can be focused down to the beam size required for materials processing. A major application of the subject invention is link blowing for semiconductor memory repair. Since a link is on the order of 1-2 microns in thickness, a beam diameter on the order of 1-2 microns will be required. With the $TEM_{00}$ mode, a beam diameter of 200-300 microns can be achieved, which can easily be focused to a beam having a diameter on the order of 1-2 microns.

Another advantage of the TEM$_{00}$ mode for materials processing is that it will be a uniform beam, with no nodes, zeroes, or other structure across the face of the beam, as will be present with the other modes. The advantage of having no structure is that the energy delivered by the laser to the material being processed can be more tightly controlled, enabling better control of the width and depth of cuts.

The lasing volume for the TEM$_{00}$ mode will depend on the characteristics of the laser cavity in the laser head, and specifically the radii of curvature of the mirrors on either side of the cavity. In the embodiment described in Baer et al., the lasing material is a laser rod comprising a Nd:YAG crystal approximately 5 mm long and 3 mm in diameter. The laser rod has a first and a second end, and the laser cavity is defined by two mirrors placed at the first and second ends, on either side of the rod. A flat mirror is placed at the first end, which can either be spaced from the first end of the laser rod, or formed directly on the first end of the laser rod. A concave mirror is placed at the second end of the rod, and spaced from the end. The radius of curvature of this mirror is 5 cm. These parameters define the diameter of the TEM$_{00}$ mode lasing volume, which in the embodiment described above, has a diameter of approximately 150–200 microns.

For maximum efficiency, the pumping volume should overlap the lasing volume as much as possible. The pumping volume will be dependent on the diameter of the fiber cable, and the extent to which the pumping radiation diverges after being emitted from the end of the fiber cable, and before entering the longitudinal end of the solid state rod in the laser head. In the embodiment described in Baer et al., the diameter of the fiber cable is 100 microns, and the pumping volume will have a diameter in the range of 100–200 microns. In addition, as described above, the lasing volume for the TEM$_{00}$ mode will be approximately 200 microns in diameter. Thus, substantial overlap is achieved.

Diode pumping also contributes to the efficiency since it can be tuned to a wavelength which overlaps the absorption band of the Nd ion produced in the laser rod in the wavelength range of interest. As a result, the diode laser light will be almost entirely absorbed, and therefore contribute to the creation of a population inversion. Compared to arc lamp pumping, which has an electrical efficiency level of only 0.5%, diode pumping has an electrical efficiency level of approximately 10%.

It is recognized that high electrical efficiency can also be achieved with diode laser side-pumped solid state lasers, as set forth more fully in Baer et al., U.S. patent application Ser. No. 103,557 entitled "High Efficiency Mode Matched Solid State Laser With Transverse Pumping," filed Sept. 30, 1987 which is incorporated by reference as though set forth herein. Therefore, the subject invention is meant to encompass embodiments employing side-pumped as well as end-pumped solid state lasers.

Because of the greater efficiency available with diode laser end-pumping, the laser will have a much higher gain at a given input power level. As a result, the laser cavity can be made extremely short in length in order to produce the short output pulses required for material ablation. As discussed earlier, for successful materials processing, the output pulses should be short compared to the diffusion time of the material being processed. For many applications, a pulse width of 50 ns or below is required, for example 30 ns. With the embodiment of the laser described in Baer et al., pulse widths on the order of 10–50 ns have been obtained.

Another benefit of the higher efficiency is that the input power can be lowered. In fact, the higher efficiency enables the laser to be operated from a 115 VAC outlet instead of a 230 VAC outlet. This allows delivery of a laser beam having the appropriate energy levels required for materials processing without the necessity of attenuating the beam. For materials processing applications, a laser beam having an energy level of 100 $\mu$J or lower, and preferably 5–10 $\mu$J, will be required in order to obtain precise cuts. Energy levels higher than this will, because of the short pulse widths involved, deliver too much power to the material, causing it to melt. This is because the power delivered by the laser will be equal to the energy level, which will remain approximately constant over many variations in the pulse width, divided by pulse width. The net result is that diode laser end-pumping delivers the proper pulse width/energy level combination required for successful, precision materials processing.

The higher electrical efficiency has significant, additional benefits. One benefit is that there will be little or no heat dissipation in the laser head, enabling the cooling system to be moved to and localized with the power supply and diode laser, which in turn will decouple the laser head from the vibrations of the cooling system. In addition, there is no need for water cooling, and the attendant noise in the laser output caused by water turbulence will be eliminated. The benefit is that more precise cuts can be made.

The above was a description of the laser component of the system. The remaining components will now be described. The optical subsystem directs the laser beam to strike the surface of material 7, and also focuses the laser beam. In the particular embodiment of FIG. 1, the optical subsystem is any standard microscope capable of focusing a 10–20 micron diameter beam to a diameter of as little as 1 micron. An exemplary microscope is Model No. P37,324 manufactured by Edmund Scientific. In addition, the video camera and monitor of the imaging subsystem are standard optical components known in the art.

The workstation is a stepper motor controlled translation workstation known in the art. An advantageous embodiment in Model No. XY-3535-M20, manufactured by New England Affiliate Technologies. In addition, the workstation is electrically coupled to the control means for storing, sequencing, and sending out commands to the workstation to position the material with respect to the laser beam. In the embodiment of FIG. 1, the computing means is a personal computer.

The function of the microscope is two fold: 1) directing and focusing the pulsed laser beam onto the surface of the material being processed in order to ablate the surface; and 2) directing an aiming beam collinear with the pulsed beam onto the surface in order to facilitate positioning of the pulsed beam.

The collinear aiming beam is advantageously the leakage light from the diode laser, which will be collinear with the pulsed beam. The leakage light will also be directed along the same optical path as the pulsed beam by the microscope or other optical subsystem to strike, but not ablate, the surface of the material. The leakage light will then reflect from the surface, and be directed by the optical subsystem along optical path 6 to the imaging subsystem, which will then display an image of the surface of the material at the point of impact. A user is then able to visually track the positioning of the pulsed beam using the monitor of the imaging subsystem, and then issue commands to the control means to reposition the pulsed beam. Alternative embodiments for the collinear, aiming beam, other than the diode laser leakage light, include operating the solid state laser in continuous wave (cw) mode at lower power, or alternatively, using an independent, collinear, aiming beam. In any of the embodiments described above, the aiming beam is used to position the laser while the pulsed beam is switched off. Once the laser is positioned, the pulsed beam is switched on to ablate the surface.

A block diagram of the optical subsystem of the exemplary embodiment of FIG. 1 is illustrated in FIG. 2. The diagram incorporates some of the components of FIG. 1, and the identifying numerals for these components have been kept the same. As illustrated, optical subsystem 2 comprises beam splitter 201 and focusing lens 202. Laser 1 is mounted at one end of the optical subsystem so that the pulsed laser beam is directed to traverse a straight optical path between the laser and the surface of the material being processed. As indicated, the beam splitter and focusing lens are placed along the optical path, and spaced from one another, so that the laser beam first intersects and passes through the beam splitter, and then the focusing lens. In the embodiment of FIG. 1, the collinear, aiming beam is the leakage light from the diode laser of laser 1. The collinear, aiming beam is also directed by the optical subsystem to traverse the same optical path as the pulsed, laser beam.

As indicted in FIG. 2, the laser beam will first be directed to strike and ablate the surface of material along optical path 5. In addition, a collinear, aiming beam will also be directed to strike but not ablate the same location on the surface. As discussed above, the aiming beam is used for positioning the pulsed beam, and the pulsed beam will typically be turned off throughout the positioning step to prevent spurious ablation. After the aiming beam strikes the surface, it will be reflected and directed along optical path 6, partially retraversing optical path 6. The reflected beam first intersects and passes through the focusing lens, and then intersects the beam splitter. In the particular embodiment of FIGS. 1 and 2, the beam splitter is a partially reflecting mirror. One of ordinary skill would appreciate, however, that any beam splitter other than a semi-reflecting mirror would be appropriate. As indicated, the video camera of imaging systems 3 is mechanically coupled to the optical subsystem, and the beam splitter is oriented to direct a fraction of the reflected aiming beam along second optical path 6 to the video camera. The camera directs the monitor (not shown) to display an image of the surface of the material at the particular location of impact on the surface of the material.

The width of the cut in the surface of the material is determined by the width of the beam impinging upon the surface. As indicated earlier, the laser beam produced by the laser head has a diameter of approximately 200-300 microns, and focusing lens 202 will focus the beam to a diameter of as little as 1-2 microns or lower. Thus, the width of a single cut will be as little as 1-2 microns or lower in the exemplary embodiment of FIG. 1, although other widths are possible simply by changing the characteristics of the focusing lens, or simply by making multiple cuts in the material which abut each other. In certain engraving applications, for example, a beam width of 10-30 microns is appropriate. It is recognized that with the availability of increasingly diffraction limited lasers, that focusing lens 202 may not be needed to produce a pulsed beam width of approximately 10-30 microns or lower (including approximately 114 2 microns or lower). In this instance, focusing lens 202 would be eliminated from the system.

The depth of penetration at a particular spot on the surface, however, will depend on the amount of time the laser beam impinges upon the particular spot. This will determine the number of pulses, and hence the energy delivered to the surface at the particular spot. In fact, the depth of the cut will vary approximately logarithmically with the delivered energy, which simply means that doubling or tripling the depth of the cut will require more than simply doubling or tripling the number of pulses delivered, and will in fact require exponentially increasing the number of pulses. In the embodiment of FIG. 1, a satisfactory depth for engraving is obtained by delivering one pulse to the surface, and then stepping the beam forward by onehalf of the beam diameter, and applying a second pulse. This process is then repeated. It is recognized that deeper cuts may be required for certain other applications, i.e. semiconductor memory repair via link blowing. In this instance, the depth of the cut must be sufficient to sever a link, and additional pulses may have to be delivered to a link to sever it than is described above with respect to engraving.

The stepping of the laser beam on the surface of the material is controlled by the workstation means. The material 7 is placed on the surface of the workstation, and the surface is moved with respect to the laser beam, which remains stationary. with respect to the surface of the workstation, which remains stationary. In the embodiment of FIG. 1, as mentioned earlier, the particular workstation used is Model No. XY-3535-M20, manufactured by New England Affiliate Technologies (hereafter "NEAT"). Another possible workstation from the same manufacturer is Model No. XY-3535-M5. In addition, in the embodiment of FIG. 1, the workstation is interfaced to the control means, which is a personal computer, via a controller, which in the embodiment is also manufactured by NEAT, Model No. 2020.

The workstation means will position the laser beam to a particular location on the surface of the material in response to commands from the computer. In addition, the workstation means will operate in two different operating modes. In the first mode, the workstation is directed to step incrementally in either the X-direction, the Y-direction, or both. Step sizes of 1 micron or less are possible. In the second mode, the workstation is directed to move to a particular X, Y location, which is defined relative to a reference location on the surface of the material. The speed with which the workstation moves to the location is programmable as well, and is also controlled by the computer.

The laser beam can be directed to strike the surface of the material while the workstation means are in motion, or alternatively, can be directed to strike the surface after the workstation means have stopped moving. In the particular embodiment of FIG. 1, the laser beam is directed to strike the surface after the workstation means have stopped. The workstation means are first directed to step in either the X or Y directions, or both, by approximately ½ the beam width, and then a single pulse is applied. The process is then repeated in order to make a cut in the surface of the material.

It is recognized that other embodiments are possible, including directing the workstation to incrementally step while at the same time delivering laser pulses to the surface, or else directing the workstation to move to a particular X, Y location (with respect to a reference location) at a particular speed while at the same time delivering laser pulses to the surface. In addition, it is recognized that step sizes of other than ½ the beam width are possible, and the delivery of more than a single pulse at each step is possible.

In the second mode of operation, the reference location must be defined to the workstation means. Only in this way will it know how to move to a particular X, Y location. Several methods are available for defining the reference location to the system. In one approach, a user visually positions the laser at the reference location using the monitor, and when the laser is so positioned, the user indicates this to the control means. To do so, the user would press a predetermined key on the keyboard of the personal computer to indicate the correct positioning of the laser at the reference location. In the embodiment of FIG. 1, the user can visually position the laser by observing the location on the surface of the material at which the laser beam is directed, and then press predetermined keys on the keyboard to cause the PC to direct the workstation to step to the reference location.

Alternatively, a predetermined detectable pattern such as a bar code can be imprinted on the surface of the material at the reference location, and the PC could be equipped with pattern recognition software to detect the code. The computer would then be programmed to scan the surface of the material and find the reference location using the pattern recognition software. To accomplish this, the video camera of the imaging system would be interfaced to the PC and pass it data descriptive of the surface of the material, which data would be derived from the reflected aiming beam picked up by the video camera. To scan the surface, the computer would be programmed to step the workstation means so that the entire surface of the material would be traversed.

The subject invention can be operated in either a manual or an automatic mode of operation. In the manual mode, a user positions, tracks, and moves the laser beam with respect to the material surface visually by means of the monitor. To do so, the user will observe the location of the aiming beam on the surface, type commands into the PC to direct the workstation to step to a particular location, type commands into the PC to direct the laser to transmit a pulsed beam of a particular duration, and then repeat this process until a precision cut at a desired location and depth is obtained.

In the automatic mode, the user first positions the laser at a reference location on the surface of the material either manually or via pattern recognition software, both of which are described above. Then the user will create descriptive data describing the location and depth of a desired cut or cuts, and load this data into the PC. The user will then signal the PC to begin cutting, and the PC will direct the workstation means to position the laser at particular locations described by the data, and once positioned, will then omit the laser to direct a pulsed beam of the particular duration described by the data. As a result, the material will be ablated, and the precision cuts made, at the locations and depths described by the data. In the automatic mode of operation, the imaging system is used, if at all, only for initially positioning the laser at the reference location.

The subject invention can be used for many different applications. As has been mentioned, a significant application is semiconductor memory repair via link blowing. A related application is blowing links in programmable logic arrays (PLA's), or other semiconductor applications where link blowing is paramount. The subject invention is particularly suited to this application since the $TEM_{00}$ mode spot size can be focused to a small enough diameter, 1 micron or less, to blow the links without damaging the rest of the chip. In addition, pulse to pulse stability, which is required to blow aluminum or tungsten links, is achieved by means of the fiber coupling, and the elimination of water cooling.

Another application particularly suited for the subject invention is the marking or inscribing of optical components, discrete semiconductor components, gallium arsenide wafers, printed circuit boards, silk screens, or a wide variety of other materials. These materials can be inscribed for cosmetic or identification purposes for use in theft detection or prevention, for example.

A third application particularly suited for the subject invention is measuring the reflectivity profile of mirrors or detecting defects in optical components using optical time domain reflectometry (OTDR). For example, an exemplary application of the use of OTDR principles is propagating laser pulses through a long fiber optical cable in order to detect defects.

Additional advantages and modifications will readily occur to those skilled in the art. The invention in its broader aspects is not, therefore, limited to the specific details, representative methods, and illustrative examples shown and described. Accordingly, departures may be made from such details from the spirit or scope of applicant's general inventive concept.

Specifically, the invention is meant to encompass all embodiments of a laser-based workstation for precision materials processing or machining, including but not limited to embodiments where the laser is a diode laser, end or side-pumped, solid state laser and to embodiments where the laser is any laser which will produce a pulsed laser beam having a width of approximately 200–300 microns or less, a pulse width of approximately 50 ns or less, and an unattenuated energy level of approximately 100 μJ or less. In addition, the invention is meant to encompass all embodiments where the pulsed laser beam is or is not focused to a beam width of approximately 10–30 microns or less (including a width of 1–2 microns or lower), where the laser is directed to move with respect to the workstation, where the workstation is directed to move with respect to the laser, where an optical subsystem other than a microscope is used to direct, focus, and split the pulsed laser and aiming beams, where an imaging subsystem is or is not integrated into the system, where the control means is or is not a PC, where the laser and aiming beams are positioned, tracked, or moved either manually or automatically, and where a reference location on the surface of the material is located either manually or automatically via pattern recognition software.

What is claimed is:

1. A q-switched diode laser pumped, solid state laser-based system for precision materials processing and machining, comprising:

lasing means including a q-switched, solid state laser cavity spaced from and coupled to a diode laser pumping source by means of an optical fiber for controllably producing and transmitting a pulsed laser beam for ablating the surface of a material;

workstation means for holding the material with respect to said pulsed laser beam;

optical means including a microscope integrally coupled to the q-switched, solid state laser cavity for directing the pulsed laser beam along an optical path to ablate the surface of the material; and control means electrically coupled to the lasing means and the workstation means for positioning the material with respect to the lasing means at a particular location, and also directing the lasing means to transmit said pulsed laser beam in order to ablate the surface of the material at that location.

2. The system of claim 1 further comprising:

means for producing an aiming beam wherein the microscope directs the aiming beam along said optical path, and to strike but not ablate the surface of the material at said particular location;

imaging means optically coupled to said optical means, wherein the aiming beam reflects from the surface of the material, and the optical means directs at least a fraction of the reflected beam to the imaging means, which then visually displays an image of the surface of the material at said particular location.

3. A laser-based system for precision materials processing and machining, comprising:

lasing means including a q-switched laser cavity spaced from and optically coupled to a pumping source for controllably producing a pulsed laser beam having a beam width of approximately 200–300 microns or less, a pulse width of approximately 50 ns or less, and an energy level of approximately 100 $\mu$J or less;

workstation means for holding the material with respect to the pulsed laser beam;

conventional optical means integrally coupled to the laser cavity for focusing the pulsed beam to a width of approximately 10–20 microns or less, and directing the focused, pulsed laser beam along an optical path to ablate the surface of the material; and control means electrically coupled to the lasing means and the workstation means for positioning the material with respect to the lasing means at a particular location, and also directing the lasing means to transmit a pulsed laser beam in order to ablate the surface of the material at that location.

4. The system of claim 3 further comprising:

means for producing an aiming beam wherein the optical means directs the aiming beam along said optical path to strike but not ablate the surface of the material at said particular location; and imaging means mechanically coupled to said optical means, wherein the aiming beam reflects from the surface of the material, and the optical means directs a fraction of the reflected beam to the imaging means, which then visually displays an image of the surface of the material at said particular location.

5. The system of claim 3 wherein the pulsed laser beam is the TEM$_{00}$ mode of the lasing means.

6. The system of claim 5 wherein the pulsed laser beam has a pulse width approximately equal to 30 ns, and an energy level approximately equal to 10 $\mu$J.

7. The system of claim 6 wherein the optical means focuses the pulsed laser beam to a diameter of approximately 1–2 microns or less.

8. A q-switched, diode-laser pumped, solid state, laser-based system for precision materials processing and machining, comprising:

lasing means including a q-switched, solid state laser cavity spaced from and coupled to a diode laser pumping source by means of an optical fiber for producing and transmitting a pulsed laser beam having a beam width of approximately 200–300 microns or less, a pulse width of approximately 50 ns or less, an energy level of approximately 100 $\mu$J or less, and which is the TEM$_{00}$ mode of the laser;

optical means including a microscope integrally coupled to the laser cavity for focusing the width of the beam to a width of approximately 10–30 microns or less, and directing the focused beam along an optical path to ablate the surface of the material;

a stepper motor-controlled workstation for holding and controllably positioning the material with respect to said pulsed laser beam; and control means electrically coupled to said lasing means and to said workstation for first directing the workstation to step horizontally, vertically, or both, to a particular location, and then directing the lasing means to transmit said pulsed beam in order to ablate the surface of the material at that location.

9. The system of claim 8 wherein the microscope focuses the pulsed laser beam to a beam width of approximately 1–2 microns or less.

10. The system of claim 9 wherein the lasing means also produces an aiming beam which is collinear with said pulsed beam, wherein the optical means also includes a beam splitter placed along a second optical path, and wherein the system further comprises imaging means optically coupled to the microscope wherein the aiming beam reflects from the surface of the material, and thereafter travels along said second optical path whereupon the beam splitter directs at least a fraction of the reflected beam to the imaging means, which then visually displays an image of the surface of the material at said particular location.

11. The system of claim 10 wherein the control means is a personal computer.

12. The system of claim 11 wherein the personal computer is programmed to first position the workstation at a particular location and then direct the laser to transmit a pulsed laser beam for a particular duration either in response to user commands typed in at the keyboard of the personal computer, or in response to data loaded into the personal computer descriptive of the location and depth of a cut in the surface of the material.

13. The system of claim 12 wherein the personal computer is electrically coupled to the imaging means, the surface of the material is imprinted with a predetermined, detectable code at a reference location, the aiming beam strikes the surface of the material at a particular location, the imaging means transmits data to the personal computer descriptive of said particular location of said surface where said aiming beam is directed, and the personal computer analyzes the data and directs the workstation to move with respect to said aiming beam, until said computer detects the predetermined code, indicating that the aiming beam is directed at said reference location.

14. A process for making precise cuts in the surface of a material comprising the steps of:

positioning a surface of a material at a particular location with respect to a pulsed laser beam from lasing means including a g-switched, solid state laser cavity spaced from and coupled to a diode laser pumping source by means of an optical fiber; and directing the pulsed laser beam to strike and abiate the surface of the material at that location by means of a microscope integrally coupled to the laser cavity.

15. The process of claim 14 wherein the pulsed laser beam has a beam width of approximately 200-300 microns or less, a pulse width of approximately 50 ns or less, and an unattenuated energy level of approximately 100 $\mu$J or less.

16. The process of claim 15 further including the step of focusing the pulsed laser beam to a width of approximately 10-30 microns or less by means of said microscope.

17. The process of claim 16 wherein the pulsed laser beam is focused to a beam width of approximately 1-2 microns or less.

18. The process of claim 15 further comprising the steps of:

directing an aiming beam to strike but not ablate, and then reflect, from the surface at a particular location;

directing a portion of the reflected beam to an imaging system for visually displaying the surface of the material at that location; and visually positioning said aiming beam at a second location using said visual display while said pulsed beam is turned off, and turning the pulsed beam on after said aiming beam has been so positioned.

19. The process of claim 18 further comprising the steps of:

initially positioning the beam at a reference location on the surface of a material;

creating data describing the location and depth of a cut with respect to said reference location; and automatically positioning and directing the pulsed beam to cut the surface of the material at the described location and depth using said data.

20. The process of claim 19 wherein the initial positioning step comprises either visually positioning the aiming beam at the reference location, or automatically positioning the beam by detecting a predetermined code imprinted on the surface at the reference location.

21. A process for making precise cuts in the surface of a material comprising the steps of:

positioning a surface of a material at a particular location with respect to a pulsed laser beam from lasing means including a q-switched laser cavity spaced from and optically coupled to a pumping source for controllable producing a pulsed laser beam having a beam width of approximately 200-300 microns or less, a pulse width of approximately 50 ns or less, and an energy level of approximately 100 $\mu$J or less; and directing the pulsed laser beam to strike and ablate the surface of the material at that location by means of conventional optical means integrally coupled to the laser cavity.

22. The process of claim 21 further including the step of focusing the pulsed laser beam to a width of approximately 10-30 microns or less by means of said conventional optical means.

* * * * *